US010973276B2

(12) United States Patent
Akay et al.

(10) Patent No.: US 10,973,276 B2
(45) Date of Patent: Apr. 13, 2021

(54) ENERGY HARVESTING FOOTWEAR COMPRISING THREE COMPRESSIBLE VOLUMES

(71) Applicant: Massachusetts Institute of Technology, Cambridge, MA (US)

(72) Inventors: Haluk Akay, Cambridge, MA (US); Ruize Xu, Watertown, MA (US); Kelsey Seto, Sharon, MA (US); Sang-Gook Kim, Wayland, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 139 days.

(21) Appl. No.: 15/791,333

(22) Filed: Oct. 23, 2017

(65) Prior Publication Data

US 2018/0206586 A1 Jul. 26, 2018

Related U.S. Application Data

(60) Provisional application No. 62/449,208, filed on Jan. 23, 2017.

(51) Int. Cl.

*A43B 3/00* (2006.01)
*H02K 7/18* (2006.01)

(Continued)

(52) U.S. Cl.

CPC .......... *A43B 3/0015* (2013.01); *A43B 3/0005* (2013.01); *H02K 7/1853* (2013.01); (Continued)

(58) Field of Classification Search

None

See application file for complete search history.

(56) References Cited

U.S. PATENT DOCUMENTS

| | | | |
|---|---|---|---|
| 326,718 A * | 9/1885 | Collins | F04D 25/166 415/61 |
| 2,086,790 A * | 7/1937 | Wroten | A43B 7/06 36/3 R |

(Continued)

OTHER PUBLICATIONS

Fu et al. "Energy Harvesting from Human Motion Using Footstep-Induced Airflow." Journal of Physics: Conference Series 660 (Dec. 10, 2015): 012060. © 2019 IOP Publishing (Year: 2015).*

(Continued)

*Primary Examiner* — Tulsidas C Patel
*Assistant Examiner* — S. Mikailoff
(74) *Attorney, Agent, or Firm* — Wolf, Greenfield & Sacks, P.C.

(57) ABSTRACT

The present disclosure is related to energy-harvesting articles of footwear, and associated components and methods. In some embodiments, an energy-harvesting article of footwear comprises a compressible bladder, a pneumatic motor fluidically connected to the compressible bladder, and an electric generator operatively coupled to the pneumatic motor. In some embodiments, energy is harvested by compressing a compressible bladder and flowing fluid from the compressible bladder through a pneumatic motor to generate power. Certain embodiments relate to pneumatic motor designs, and/or to methods of flowing fluid input through pneumatic motors.

28 Claims, 12 Drawing Sheets

(51) Int. Cl.
*F16J 3/04* (2006.01)
*A43B 13/18* (2006.01)

(52) U.S. Cl.
CPC ........ *A43B 13/189* (2013.01); *F05D 2220/76* (2013.01); *F16J 3/04* (2013.01)

(56) References Cited

U.S. PATENT DOCUMENTS 4,074,951 A * 2/1978 Hudson ................. F03D 3/0463 415/2.1
4,266,403 A * 5/1981 Hirbod .................... F03B 13/24 60/698
5,179,792 A * 1/1993 Brantingham ....... A43B 3/0005 251/4
5,353,525 A * 10/1994 Grim ...................... A43B 7/081 36/114
5,375,345 A * 12/1994 Djuric ...................... A43B 3/00 36/3 B
5,661,916 A * 9/1997 Huang ..................... A43B 3/00 36/132
5,846,063 A * 12/1998 Lakic ..................... A42B 3/122 417/440
5,918,381 A * 7/1999 Landry ................ A43B 1/0054 36/3 B
6,041,518 A * 3/2000 Polycarpe ............ A43B 3/0005 36/2.6
6,085,444 A * 7/2000 Cho ......................... A43B 7/06 36/3 B
6,182,378 B1 * 2/2001 Sendaula ................. A43B 3/00 36/136
6,201,314 B1 * 3/2001 Landry .................... A43B 3/00 290/54
6,239,501 B1 * 5/2001 Komarechka ............ A43B 3/00 290/1 R
6,255,799 B1 * 7/2001 Le ........................... A43B 3/00 219/211
6,281,594 B1 * 8/2001 Sarich ...................... A43B 3/00 290/1 A
6,430,843 B1 * 8/2002 Potter .................. A43B 3/0005 36/28
7,331,121 B2 * 2/2008 Lo .......................... A43B 7/081 36/3 B
7,426,793 B2 * 9/2008 Crary ..................... A43B 7/081 36/114
7,448,150 B1 * 11/2008 Davis ................... A43B 13/203 36/153
7,614,168 B1 * 11/2009 Zummer ............ A61H 15/0078 36/141
7,956,476 B2 * 6/2011 Yang ........................ A43B 3/00 290/1 R
8,013,463 B2 * 9/2011 Preston ..................... F03G 7/00 290/1 R
8,228,031 B2 * 7/2012 Alameh .................... H02J 7/32 320/115
9,107,468 B1 * 8/2015 Xiong ...................... A43B 7/02
9,175,676 B2 * 11/2015 Fortin ....................... F04B 9/14
9,359,992 B2 * 6/2016 Ignatchenko ......... F03B 17/005
9,510,646 B2 * 12/2016 Holt ..................... A43B 13/223
9,574,563 B2 * 2/2017 Palmer .................... F04D 5/002
9,893,652 B2 * 2/2018 Otagiri ...................... H02N 2/18
10,278,449 B2 * 5/2019 Langvin ............... A43B 13/203
10,280,902 B2 * 5/2019 Ignatchenko ......... F03B 17/005
10,499,705 B2 * 12/2019 Holt ..................... A43B 13/188
10,512,297 B2 * 12/2019 Vamvas ............... A43B 13/206
2004/0020449 A1 * 2/2004 Stevens ................. F04D 25/166 123/41.49
2005/0055846 A1 * 3/2005 Caldwell ............. A43B 13/189 36/29
2005/0183286 A1 * 8/2005 Crary ..................... A43B 7/081 36/3 B
2006/0156575 A1 * 7/2006 Lo ........................ A43B 13/203 36/3 B
2006/0185196 A1 * 8/2006 Wang ..................... A61H 39/04 36/141
2006/0248750 A1 * 11/2006 Rosenberg ........... A43B 1/0054 36/29
2008/0127510 A1 * 6/2008 Yang .................... A43B 3/0015 36/136
2010/0045233 A1 * 2/2010 Alameh .................... H02J 7/32 320/114
2010/0102567 A1 * 4/2010 Nash ....................... F03B 17/02 290/54
2010/0223813 A1 * 9/2010 Ozturk ..................... A43B 3/00 36/105
2011/0089702 A1 * 4/2011 Boren ................... F03B 17/063 290/55
2011/0131839 A1 * 6/2011 Ballin .................. A43B 13/186 36/141
2011/0163552 A1 * 7/2011 Zhang ..................... F03D 1/025 290/55
2014/0020264 A1 * 1/2014 Holt ..................... B29D 35/148 36/103
2014/0068973 A1 * 3/2014 Krupenkin ........... A43B 3/0015 36/136
2014/0250875 A1 * 9/2014 Ignatchenko ............. F03G 7/08 60/325
2015/0320137 A1 * 11/2015 Fortin .................. A43B 13/203 60/327
2016/0143562 A1 * 5/2016 Ashby .................. A61B 5/1038 600/595
2016/0273522 A1 * 9/2016 Ignatchenko ......... F03B 17/005
2016/0344309 A1 * 11/2016 Otagiri ...................... F03G 5/06
2018/0206586 A1 * 7/2018 Akay ................... A43B 3/0015
2019/0013755 A1 * 1/2019 Stach ........................ H02J 7/32
2019/0053572 A1 * 2/2019 Patton .................. A43B 3/0005
2019/0210030 A1 * 7/2019 Connolly .................. B01L 7/52
2019/0254380 A1 * 8/2019 Vamvas ............... A43B 13/206

OTHER PUBLICATIONS

Akay et al., Energy harvesting from human footsteps, MIT Micro/Nano Systems Lab Poster. Annual Fall MIT IDC Poster Session. MIT Department of Mechanical Engineering. Oct. 24, 2016.*

Hughes et al., The pattern of pressure distribution under the weightbearing forefoot. The Foot. Nov. 1991;1(3):117-24.

Akay et al., Energy harvesting from human footsteps, MIT Micro/Nano Systems Lab Poster. Annual Fall MIT IDC Poster Session. MIT Department of Mechanical Engineering. Oct. 24, 2016. 1 page.

* cited by examiner

ENERGY HARVESTING FOOTWEAR COMPRISING THREE COMPRESSIBLE VOLUMES

CROSS-REFERENCE TO RELATED APPLICATIONS

This application claims the benefit under 35 U.S.C. § 119(e) of U.S. provisional application Ser. No. 62/449,208, filed Jan. 23, 2017, the disclosure of which is incorporated by reference in its entirety.

FIELD

Disclosed embodiments are related to energy harvesting articles of footwear, and associated components and methods.

BACKGROUND

Human locomotion typically dissipates large amounts of energy on the order of about 10 W to 15 W. However, prior attempts at harvesting this energy using materials such as piezoelectric materials incorporated into shoes and other articles of clothing has only resulted in the ability to harvest energy of the order of about 1 mW to 5 mW.

SUMMARY

In some embodiments, energy-harvesting articles of footwear is provided. An energy-harvesting article of footwear may comprise an outer sole, an inner surface, a compressible bladder disposed between the outer sole and the inner surface, a pneumatic motor fluidically connected to the compressible bladder, and an electric generator operatively coupled to the pneumatic motor. The electric generator may convert motion of the pneumatic motor into electrical power.

In some embodiments, methods of harvesting energy are provided. A method of harvesting energy may comprise compressing a compressible bladder disposed between an outer sole and an inner surface of an article of footwear, and flowing fluid from the compressible bladder through a pneumatic motor to generate electrical power.

In some embodiments, pneumatic motors are provided. A pneumatic motor may comprise a first port, a second port, and a first turbine fluidically connected to the first port and the second port. Fluid input to the first port may drive the first turbine in a first direction and may flow through the second port. Fluid input to the second port may drive the first turbine in the first direction and may flow through the first port.

In some embodiments, methods of operating pneumatic motors are provided. A method of operating a pneumatic motor may comprise flowing fluid input to a first port through a first turbine, and flowing fluid input to a second port through the first turbine. The fluid input to the first port may drive the first turbine in a first direction. The fluid input to the second port may drive the first turbine in the first direction.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
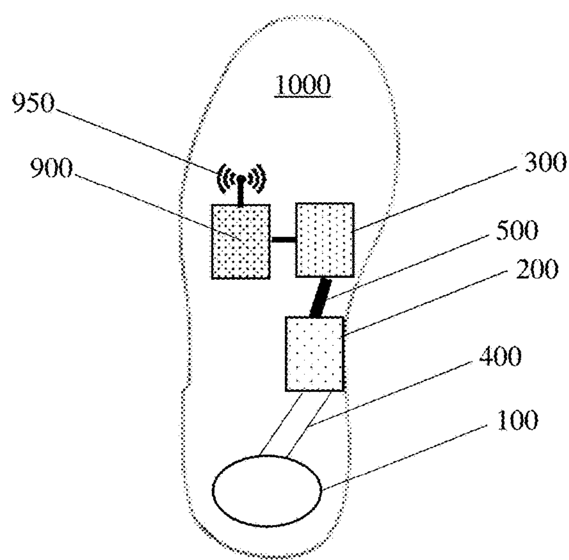
FIGS. 1A and 1B are schematic depictions of an energy-harvesting article of footwear according to one embodiment.

The Inventors have recognized that the ability of prior systems to harvest energy in footwear and other wearable devices using piezoelectric materials, and other solid state conversion techniques, was limited due to these structures and materials undergoing very limited deflections at relatively low pressures when incorporated in wearable structures. This limitation of the systems, as well as limitations associate with the materials themselves, directly resulted in these devices harvesting a very small percentage of the available energy from the locomotion of a wearer. Accordingly, the Inventors have recognized the benefits associated with wearable systems that include one or more components that may be used to drive a fluid (e.g., air, another gas, or even a liquid in some embodiments) to operate a pneumatic motor and associated electrical generator to harvest larger amounts of energy from the locomotion of an individual as compared to these prior systems.

In view of the above, wearable energy-harvesting articles, components thereof, and methods for harvesting energy are generally described herein. In some embodiments, an energy-harvesting article may comprise one or more features configured to harvest energy expended by a wearer of the article during locomotion. It should be understood that while certain components and systems described herein offer various benefits which may increase the efficiency of energy conversion of a system, the various components and systems described herein may be used either individually and/or in any suitable combination as the disclosure is not so limited. Additionally, while specific benefits are described herein, it is possible that some embodiments may not include the noted benefits, and/or may offer different benefits.

In one embodiment, a wearable energy-harvesting article may convert energy from the locomotion of an individual into electrical energy. For example, a wearer of an article may provide mechanical energy to the article (e.g., by compressing the article, and/or a component thereof, during walking, running, jumping, and/or during other forms of movement). Accordingly, an article may be configured to harvest this mechanical energy provided by the individual using one or more components configured to convert mechanical energy into electrical energy. In one specific embodiment, an article may include a compressible bladder configured to undergo deformation under an applied pressure. Specifically, compressing, and subsequently expanding, the compressible bladder causes a fluid (e.g., air, another gas, or a liquid) to flow out from, and back into, the compressible bladder. The associated fluid flow during the compression and/or expansion of the compressible bladder may be used to drive a pneumatic motor operatively coupled to an electric generator. Thus, driving the pneumatic motor correspondingly drives the electric generator which may be configured to convert the mechanical energy output by the pneumatic motor into electrical energy. Any suitable compressible bladder may be employed, non-limiting examples of which may include air bladders, rubber bulbs, and integral chambers formed in the wearable component the energy harvesting system is incorporated with (e.g., chambers formed within a portion of an article, such as within a sole of an article of footwear).

In some embodiments, a flow of fluid used to operate a pneumatic motor may flow through the pneumatic motor in one or more directions to drive the pneumatic motor during different portions of an operation cycle. For example, in a first mode of operation, when a compressible bladder is compressed, a fluid may flow out from the compressible bladder and through the pneumatic motor to drive the pneumatic motor. In a second mode of operation, the compressible bladder may expand causing a fluid to flow through the pneumatic motor to the compressible bladder. In some embodiments, the flow of fluid through the pneumatic motor during both the first and second modes of operation may cause the pneumatic motor to operate in a single first direction. In another embodiment, the flow of fluid through the pneumatic motor during the first and second modes of operation may cause the pneumatic motor to operate in a first direction and a second opposing direction as the disclosure is not so limited. Thus, in some embodiments, the a pneumatic motor may be configured to harvest energy during both compression and expansion portions of an operation cycle of the compressible bladder. However, embodiments in which a pneumatic motor is operated only during compression or expansion of an associated bladder are also contemplated as the disclosure is not limited in this fashion.

It should be understood that the disclosed energy harvesting systems may include any appropriate type of pneumatic motor capable of transforming energy from a flow of fluid into mechanical energy capable of powering an associated electrical generator to generate electricity. Several non-limiting examples of pneumatic motor that may be used to harvest energy from a fluid flow may include, but are not limited to, one or more turbines, microturbines, rotary vanes, axial pistons, radial pistons, as well as gerotors to name a few.

As noted above, in some embodiments, an article may include one or more electric generators that are operatively coupled to one or more associated pneumatic motors. In such an embodiment, the one or more electric generators may be configured such that operation of the one or more pneumatic motors operates the one or more electric generators to generate electrical power. For example, an electric generator may be coupled to a pneumatic motor using a direct shaft connection, universal coupling, one or more gear stages, and the like. Therefore, motion of the pneumatic motor(s) may cause motion of an associated rotor of the electric generator to generate electrical power. Appropriate types of generators include, but are not limited to, various types of direct-current generators and alternating current generators as the current disclosure is not limited to any particular type of electrical generator.

It should be understood that any number of pneumatic motors and associated electrical generators may be used with the various embodiments described herein. For example, in some embodiments, an article of footwear may comprise more than one pneumatic motor that is operatively associated with more than one electric generator. In some such embodiments, the electric generators and/or the pneumatic motors may be connected in series. However, embodiments in which the electrical generators and/or the pneumatic motors are connected in parallel within an associated hydraulic or electrical circuit are also contemplated.

As elaborated on further below, an energy harvesting system may be incorporated into an article of footwear. Specifically, in some embodiments, a compressible bladder may be integrated within a sole of an article of footwear. For example, a compressible bladder may be positioned between an outer sole and an inner surface of the article of footwear (e.g. an insole) that is located adjacent to the foot of a person when worn. Depending on the particular embodiment, the compressible bladder may either be a separate structure that is incorporated into the sole, or the compressible bladder may be integrally formed within the sole as the disclosure is not so limited. Additionally, the associated flow paths between a compressible bladder and an associated pneumatic motor may also be separate structures that are incorporated into the sole and/or may be formed within the sole as the disclosure is not limited in this fashion.

As noted above, in some embodiments, a wearable energy harvesting system may be incorporated into an article of footwear. Appropriate types of footwear include, but are not limited to, shoes, running shoes, boots, sandals, athletic shoes, sneakers, boots, combat boots, hiking boots, or any other appropriate article of footwear. The article of footwear may be configured to be worn by an adult, a man, a woman, and/or a child. In some embodiments, the article of footwear may have an ergonomic design.

While the embodiments described herein are primarily directed to harvesting energy through the use of a system incorporated in an article of footwear, the current disclosure is not so limited. Instead, the various components and systems described herein may be incorporated into any other wearable structures that may experience compression, and/or motion, that may be used to compress an associated compressible bladder. Several non-limiting examples of wearable structures that may include an energy harvesting system include, but are not limited to, sleeves, leggings, pants, shirts, socks, and/or any other appropriate wearable structure. For example, a compressible bladder may be positioned within a portion of these wearable structures that is compressed during various types of movement of an individual. Alternatively, a linkage or other type of physical connection may be used to couple a moving portion of an individual to an associated compressible bladder that is held stationary to that portion of the individual to cyclically compress and expand the compressible bladder. For instance, movement of a joint may be used to actuate a linkage to compress a bladder. Accordingly, the current disclosure should be interpreted broadly as teaching energy harvesting systems that may be incorporated into any desired type of wearable component that may be associated with any number of different portions of an individual.

In some embodiments, an energy harvesting system may be configured to harvest relatively large amounts of energy during locomotion of a wearer. For example, as noted previously, an average human may dissipate between 10 W and 15 W during walking. Accordingly, in some embodiments, an energy harvesting system may be configured to harvest energy with an average power over time that is greater than or equal to 10 mW, 20 mW, 50 mW, 100 mW, 200 mW, 500 mW, 1 W, 2 W, 5 W, or any other appropriate power rating during normal usage. The harvested energy may also have an average power that is less than or equal to 10 W, 5 W, 2 W, 1 W, 500 mW, 200 mW, 100 mW, 50 mW, 20 mW, or any other appropriate power rating. Combinations of the above-referenced ranges are also possible (e.g., greater than or equal to 10 mW and less than or equal to 10 W). Other ranges both smaller and larger than those are also possible. The average power generated by an energy harvesting system may be determined by using a wattmeter during use of a system.

In some embodiments, an energy harvesting system may be configured to harvest a large portion of the energy expended by a wearer of the energy harvesting system. The energy harvesting system may be configured to harvest greater than or equal to 0.1%, 0.2%, 0.5%, 1%, 2%, 5%, 10%, 20%, or 50% of the energy expended by a wearer of the energy harvesting system. Correspondingly, the energy harvesting system may harvest less than or equal to 75%, 50%, 20%, 10%, 5%, 1%, 0.5%, or 0.2% of the energy expended by a wearer of the energy harvesting system. Combinations of the above-referenced ranges are also possible (e.g., greater than or equal to 0.1% and less than or equal to 75%). Other ranges both smaller and larger than those noted above are also possible. The percentage of energy harvested by the energy harvesting system may be determined by dividing the amount of energy harvested by the energy harvesting system by the energy expended by a wearer of the energy harvesting system and multiplying by 100%. The amount of energy harvested by the energy harvesting system may be determined by integrating the power generated by the energy harvesting system as determined by a wattmeter over the total energy harvesting time. The energy expended by a wearer of the energy harvesting system may be determined by motion capture, pressure sensing plates located along a walkway, and/or by using any other appropriate method.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

In some embodiments, an article may comprise a compressible bladder. The compressible bladder may be configured to undergo compression when subject to an applied pressure, and/or to undergo expansion upon removal of the applied pressure. In some embodiments, the compressible bladder may be resilient such that it expands on its own once a pressure has been removed. As described above, in certain embodiments the compressible bladder may be in fluid communication with a pneumatic motor. In some embodiments, compression of the compressible bladder may expel fluid from the compressible bladder through the pneumatic motor. Additionally, expansion of the compressible bladder may draw fluid through the pneumatic motor into the compressible bladder. This may cause the pneumatic motor to harvest fluid energy during both compression and expansion of the compressible bladder, which may allow it to operate relatively continually and/or increase the total amount of energy harvested. However, embodiments in which a pneumatic motor is operated only during one of the compression and expansion of a compressible bladder are also contemplated.

In some embodiments, a compressible bladder may be fluidically connected to a pneumatic motor through one or more connections that are configured to minimize leakage of the fluid. This may be accomplished using any appropriate sealing method between the various fluidic channels, compressible bladders, pneumatic motors, and/or other components described herein. Appropriate types of seals may include, but are not limited to, O-rings, welds, adhesives, clamps, sealing compounds applied at the interfaces between components, and or any other appropriate sealing method. Without wishing to be bound by any particular theory, it is believed that minimizing leakage of a flow of fluid between a compressible bladder and associated pneumatic motor may help reduce energy losses due to leakage and increase maximum pressures which may also increase a total power and/or peak power output from a system.

FIG. 1A shows one non-limiting example of an article of footwear 1000 that includes a compressible bladder 100, a pneumatic motor 200, an electric generator 300, a controller 900, and a wireless communicator 950 which may implement any desirable communication protocol including a cellular network, Bluetooth communication, radio frequency signals, wifi, and/or using any other appropriate communication protocol. In the depicted embodiment, the compressible bladder is fluidically connected to the pneumatic motor by a fluidic channel 400. Appropriate types of fluidic channels may include, but are not limited to, passageways through which fluid can flow such as tubes, channels formed in a component (machined, molded, or otherwise formed therein), and/or any other appropriate structure through which fluid may flow. The fluidic channels may have any suitable length, tortuousity, cross-sectional dimension, volume, and the like. The pneumatic motor is operatively connected to the electric generator by a connection 500 that connects an outlet of the compressible bladder to at least a first port of the pneumatic motor. Appropriate types of connections between the pneumatic motor and the electric generator may include, but are not limited to, any appropriate transmission capable of transferring mechanical motion from an output shaft of the motor to an input shaft of the electrical generator. For example, appropriate connections may include direct shaft connections, universal couplings, one or more gear stages, and the like. In some embodiments, the system may also include the controller which may control one or more operating parameters of the electrical generator during use as discussed further below. The wireless communicator, an optional feature, may be configured to communicate information from the article of footwear to an external device and/or from an external device to the article of footwear. However, embodiments in which a different type of component is connected to the controller instead of a wireless communicator are also contemplated.

It should be understood that the arrangement of components in FIG. 1A is merely exemplary, and that other arrangements of the compressible bladder, pneumatic motor, electric generator, fluidic channel, and connection are also possible. For example, while the bladder is shown as being located in the heel of the article of footwear in FIG. 1A, in other embodiments the compressible bladder may be positioned in another location (e.g., at the ball of the foot, at one or more toes) of the article of footwear. As another example, while the pneumatic motor and electric generator are shown within the outer boundary of the sole in FIG. 1A, in other embodiments, the pneumatic motor and/or electric generator may be located externally to the article of footwear and/or embedded in one or more other portions of the article of footwear as the disclosure is not so limited.

In some embodiments, one or more components of an article of footwear may be positioned at least partially within, and in some cases fully enclosed within, the interior of an article of footwear. For example, a component may be embedded in, or otherwise integrated with, a sole of the article of footwear. In one such embodiment, the component may be positioned between an outer sole (i.e. a bottom most surface of an article of footwear configured to be positioned against the ground when worn) and an insole, or other surface adjacent a person's foot when worn. In one such embodiment, an article of footwear may comprise a compressible bladder that is fully enclosed by the article of footwear such that the compressible bladder is between an outer sole of the article of footwear and an inner surface of the article of footwear.

In some embodiments, the article of footwear may include one or more components that are partially enclosed by the article of footwear (e.g., surrounded on one or more sides by the article of footwear but accessible from the exterior of the article of footwear, such as an innersole). For instance, a component may be positioned on an interior surface of an upper (i.e. a portion of an article of footwear that covers the front of a person's foot when worn), or disposed on an insole. In some embodiments, a pneumatic motor, an electric generator, and/or other appropriate components of a system may be positioned in the interior of an article of footwear, on an inner surface of an upper, and/or other appropriate portion of the article of footwear.

In still other embodiments, the article of footwear may comprise one or more components that are not enclosed by the article of footwear (e.g., positioned on an exterior surface of the article of footwear). As an example, a component may be positioned on an exterior surface of a sole, an exterior surface of an upper, and/or any other appropriate exterior portion of an article of footwear. For example, in some embodiments, a pneumatic motor, an electric generator, and/or other appropriate components may be positioned on an exterior surface of an upper.

Figure 1B:
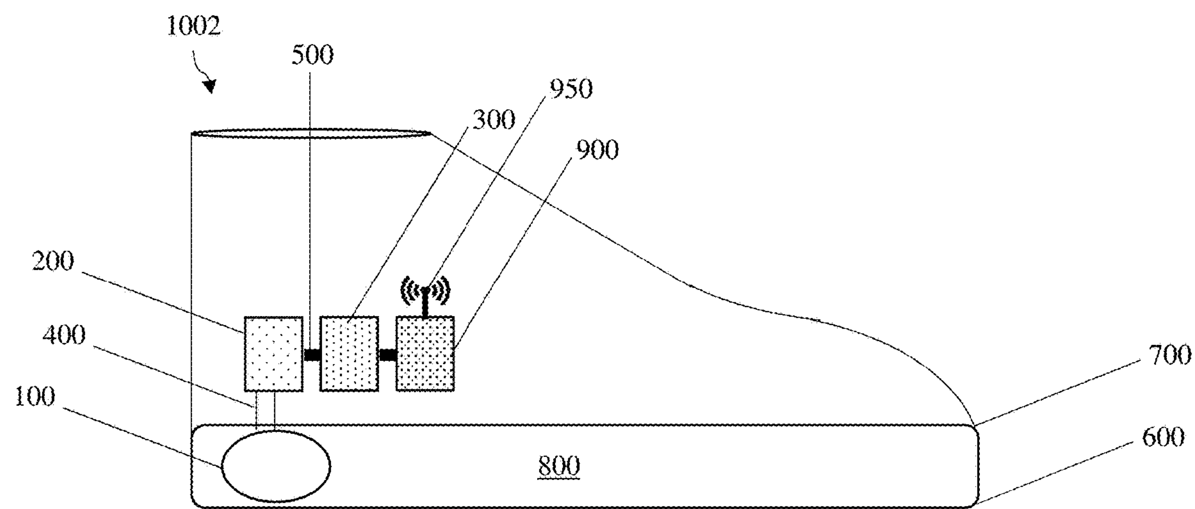

FIG. 1B shows one non-limiting embodiment of an article of footwear in which a compressible bladder is fully enclosed within an article of footwear. In the depicted embodiment, an article of footwear 1002 may include a compressible bladder 100 incorporated in a sole 800 of the article of footwear. Specifically, the compressible bladder may be positioned between an outer sole 600 and an inner surface 700, such as an insole, that is located adjacent to the foot of a person wearing the article of footwear. Article of footwear 1002 also comprises a pneumatic motor 200 fluidically connected to a compressible bladder 100 by one or more fluidic channels 400 and an electric generator 300 operatively connected to pneumatic motor 200 by connection 500. The one or more fluidic channels may be in any suitable location and have any suitable structure. In certain cases, the one or more fluidic channels may be external to the article of footwear. For instance, the one or more fluidic channels may be tubing that runs from the sole around the exterior of the article of footwear and on the upper. In other embodiments, the one or more fluidic channels may be one or more channels that are formed within a portion of the article of footwear itself, such as a channel formed in the sole and/or upper of the footwear and/or tubing that runs through the interior of the sole and/or upper. While the pneumatic motor, electrical generator, controller 900, and wireless communicator 950 have been depicted as being located on an upper of the article footwear, embodiments in which one or more of these components is positioned within the sole of the article footwear are also contemplated.

Figure 2A:
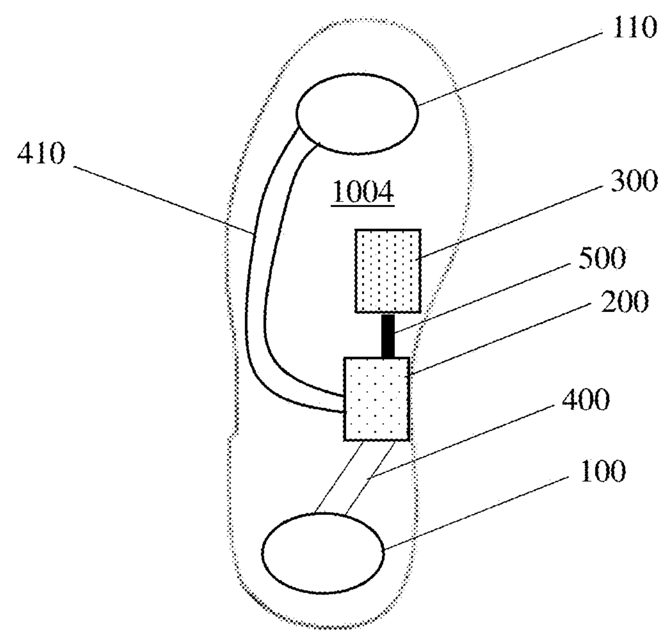
FIG. 2A is a schematic depiction of an energy-harvesting article of footwear according to one embodiment.

When present, a compressible bladder within an article of footwear may have a variety of suitable designs. In some embodiments, an article of footwear may comprise a single compressible bladder, as in FIGS. 1A-1B. However, in some embodiments, an article of footwear may comprise more than one compressible bladder (e.g., at least two compressible bladders, at least three compressible bladders, or any other suitable number of compressible bladders). For example, as shown in FIG. 2A, an article of footwear 1004 may comprise two compressible bladders 100 and 110 that are positioned within different locations within the sole of the depicted article of footwear. It should be understood, that the two or more compressible bladders may be located in any desirable portion of an article of footwear. However, specific locations for the two or more compressible bladders are described further below. As described previously, the compressible bladders may be in fluidic communication with one or more pneumatic motors 200 through one or more fluidic channels such as first and second fluidic channels 400 and 410. The article of footwear may also include an electric generator 300 that is operatively connected to a pneumatic motor 200 by a connection 500 as previously describe.

In the above embodiment, the two fluidic channels coupling the separate compressible bladders with the one or more pneumatic motors have been depicted as separate components attached to separate ports of the pneumatic motor. However, the current disclosure is not limited to this particular configuration. For example, the two fluidic channels may be connected to a primary fluidic channel that is connected to a port of the pneumatic motor. Alternatively, the two fluidic channels may be connected to two separate pneumatic motors. Accordingly, the current disclosure should not be limited to only the arrangement of fluidic channels depicted in the figures.

In some embodiments, the one or more compressible bladders of an article of footwear may be arranged in a manner that is advantageous for energy harvesting. For example, in some embodiments, one or more compressible bladders may be positioned at locations within the article of footwear where larger local pressures are applied and removed during one or more types of locomotion (e.g., by a foot of a wearer of the article of footwear). These positions may include one or more of locations within the interior of an article of footwear that are positioned adjacent to a heel, a ball of the foot, and one or more toes of a person wearing the article of footwear.

Without wishing to be bound by any particular theory, it may be desirable to avoid positioning compressible at locations where pressure is not cyclically applied and removed during locomotion. For example, a portion of an article of footwear underlying the arch of a person's foot does not undergo extensive compression during locomotion. Accordingly, if there are one or more compressive bladders within an article of footwear that are at least partially span the arch of a foot, such a bladder configuration may accommodate the compression of gas from another portion of the article of footwear without the gas passing through an associated pneumatic motor which may reduce the amount of energy harvested from the compression. Accordingly, in some embodiments, it may be beneficial for the one or more compressible bladders of a system to not be positioned beneath an arch of a foot, or for a relatively small portion of the total volume of a total compressible bladder volume to be positioned under the arch of an article of footwear. For example, a volume of the one or more compressible bladders located beneath the arch of an article of footwear may be less than 5 vol %, less than 2 vol %, less than 1 vol %, or any other appropriate volume percentage of a total bladder volume for the article of footwear. However, it should be understood that embodiments in which a bladder, and/or a portion of a bladder, is positioned within an arch of an article of footwear are also contemplated as the disclosure is not so limited.

An article of footwear may comprise compressible bladder(s) with any suitable volume(s). An article of footwear may comprise a compressible bladder with a volume of greater than or equal to 3 cubic centimeters (cc), greater than or equal to 5 cc, greater than or equal to 10 cc, greater than or equal to 30 cc, greater than or equal to 50 cc, or greater than or equal to 100 cc. An article of footwear may comprise a compressible bladder with a volume of less than or equal to 200 cc, less than or equal to 100 cc, less than or equal to 50 cc, less than or equal to 30 cc, less than or equal to 10 cc, or less than or equal to 5 cc. Combinations of the above-referenced ranges are also possible (e.g., between or equal to 3 cc and 200 cc, 50 cc and 200 cc, or any other appropriate combination). Of course, embodiments in which different volumes both larger and smaller than those noted above are also possible.

In some embodiments, it may be advantageous for an article of footwear to comprise two or more compressible bladders that may be configured to be compressed at different points in time during a gait cycle of a person (e.g. walking, running, jumping, etc.). Without wishing to be bound by theory, this type of configuration may help increase the amount and/or duration of power generation during the gait cycle of an individual. Thus, understanding the gait cycle of an individual may help inform where to position one or more compressible bladders within an article of footwear for harvesting energy due to different portions of the foot experiencing varying pressures at different times throughout the gait cycle. For example, in some embodiments, two or more compressible bladders may positioned at locations within an article of footwear that experience maximum compression and expansion during overlapping and/or sequential portions of a gait cycle. The gait cycle includes the sequential stages of heel strike, flat foot, midstance, heel off, toe off, and swing. This cycle results in pressure being applied to the heel first, then the ball of the foot, and then the toes. Pressure is then removed from the heel, ball of the foot, and toes in sequence.

In some embodiments, knowledge of the sequential application of pressure to different portions of an individual's foot, and thus, an associated article of footwear during the gait cycle of an individual may be used to design an article of footwear which comprises a first compressible bladder and at least a second compressible bladder that may be arranged such that they may be sequentially compressed, and subsequently expanded, during the gait cycle of a person wearing the article of clothing. For example, two or more bladders may be located within the heel of an article of footwear, adjacent a ball of the foot when worn, adjacent to one or more toes of a person when worn, and/or within other portions of an article of footwear that experience sequential compression during a gait cycle. Without wishing to be bound by any particular theory, it is believed that such a configuration: may be more comfortable for a wearer of the article of footwear; may enable longer, and in some instances possibly continuous, power generation during use; and/or may harvest a larger amount of energy than an article of footwear comprising a single compressible bladder or an article of footwear comprising compressible bladders that are configured to be compressed and expanded together.

During operation, the electrical power generated by an energy harvesting system may present as one or more peaks associated with points in time when one or more compressible bladders of a system are compressed and/or expanded. For example, a peak may be associated with a point in time when the level of compression of a compressible bladder changes most rapidly (e.g., when pressure is first applied and/or removed from a compressible bladder to begin compression and/or expansion of the compressible bladder. In instances where multiple compressible bladders are used, multiple peaks and/or extended power generation pulses may be present during usage of a system. For instance, separate local peaks in power generation may be associated with times when pressure is sequentially applied to first and the second compressible bladders and/or when pressure is sequentially removed from the first and second compressible bladders.

In some embodiments, the electrical power generated by an energy harvesting system may comprise peaks which are associated with compression of a compressible bladder by a heel. These peaks may produce a voltage over a 22 ohm resistor of between 3.5 V and 4 V. The electrical power generated by an energy harvesting system may, in certain cases, comprise peaks which are associated with expansion of a compressible bladder by a heel. These peaks may produce a voltage over a 20 ohm resistor of between 1.5 V and 2 V. In some embodiments, an energy harvesting system may produce a voltage of close to 0 V over a 22 ohm resistor in between two successive peaks (e.g., between two successive peaks associated with compression of a compressible bladder, between a peak associated with compression of a compressible bladder and a peak associated with expansion of the compressible bladder, or other appropriate configurations). When both peaks associated with compression of a compressible bladder and peaks associated with expansion of the compressible bladder are present, the peaks may be temporally separated by any suitable amount of time. In some embodiments, peaks are separated in time by a period of time of between 0.25 seconds and 0.5 seconds or any other appropriate time period. However, it should be understood that systems exhibiting different voltages, powers, and peak responses are also contemplated as the disclosure is not so limited.

In some embodiments, the time over which a compressible bladder is configured to expand may be optimized based on the expected timing of a gait cycle of a person. For instance, a compressible bladder may be configured using stiffness/resilience of the bladder, bladder volume, flow resistance of the system, and/or other appropriate design parameters such that it expands from a fully compressed state to a fully inflated state over a period of time that is shorter than an expected time between successive heel strikes, i.e. a gait cycle frequency. Thus, in some embodiments, a compressible bladder may be configured to expand from a fully compressed state to a fully expanded state over a period of time of less than or equal to 1 second, 0.8 seconds, 0.5 seconds, 0.4 seconds or any other appropriate time period for a desired type of motion. The time period for a compressible bladder to expand from a fully compressed state to a fully expanded state may also be greater than or equal to 0.2 seconds, 0.4 seconds, 0.5 seconds, 0.8 seconds or any other time period. Combinations of the above-referenced ranges are contemplated (e.g., greater than or equal to 0.2 seconds and less than or equal to 1 second). Other time ranges both smaller and larger than those noted above are also contemplated.

Figure 2B:
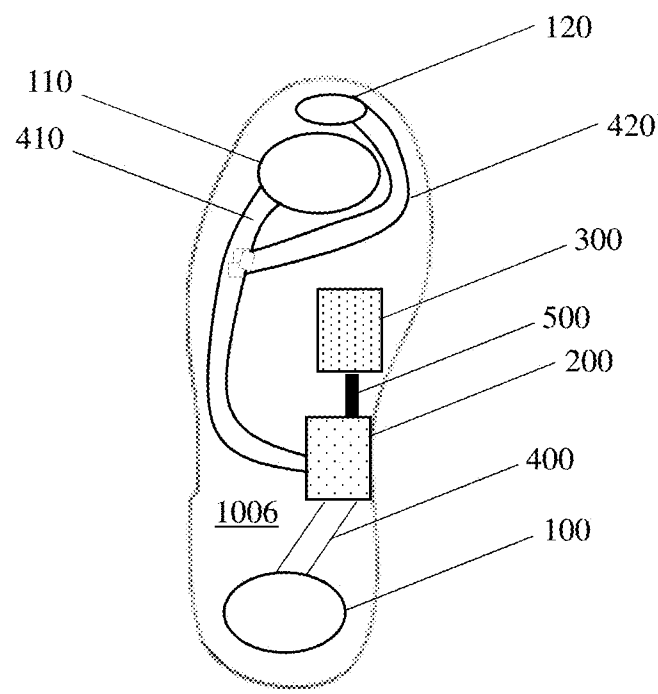
FIG. 2B is a schematic depiction of an energy-harvesting article of footwear according to one embodiment.
Figure 2C:
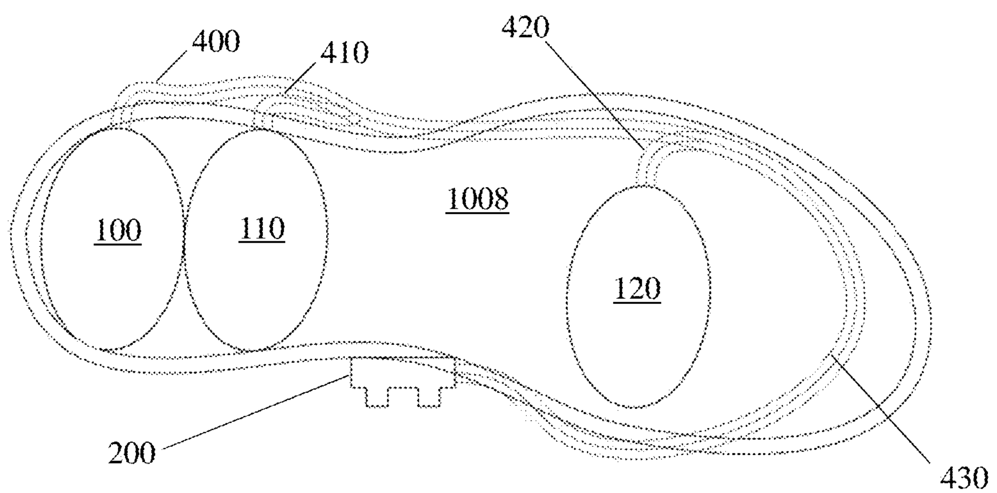
FIG. 2C is a schematic depiction of an energy-harvesting article of footwear according to one embodiment.
Figure 2D:
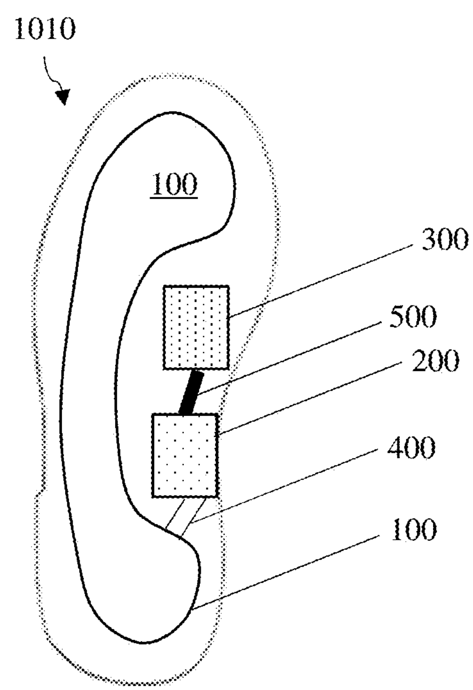
FIG. 2D is a schematic depiction of an energy-harvesting article of footwear according to one embodiment.

FIGS. 2B-2D show several additional non-limiting embodiments of articles of footwear comprising compressible bladders positioned in different locations to harvest energy. In FIG. 2B, an article of footwear 1006 comprises first, second, and third compressible bladders 100, 110, and 120, which are in fluidic communication with a pneumatic motor 200 by fluidic channels 400, 410, and 420, respectively. Compressible bladder 100 is positioned on a portion of article of footwear 1006 configured to be positioned beneath a heel of a foot; compressible bladder 110 is positioned on a portion of article of footwear 1006 configured to be positioned beneath a ball of a foot; and bladder 1020 is positioned on a portion of article of footwear 1006 configured to be positioned beneath one or more toes. When an individual places their foot on the ground during locomotion, the first compressible bladder associated with the heel is configured to be compressed first during heel strike, followed by the second compressible bladder under the ball of the foot during foot flat and midstance, and then the third compressible bladder may be fully compressed between midstance and toe off. Additionally, when an individual raises their foot off the ground during locomotion, the first compressible bladder is configured to be expanded first after heel off, followed sequentially by the second compressible bladder and the third compressible bladder during toe off. As shown in FIG. 2B, each compressible bladder may be placed in fluid communication with the pneumatic motor through one or more separate fluidic channels and/or one or more combined fluidic channels. For example, as shown in the figure, two or more fluidic channels, such as fluidic channels 410 and 420, may join together, or otherwise be attached to, one or more primary channels that are in fluid communication with the pneumatic motor. For example, in some embodiments, there may be a single primary flow path from the compressible bladders to the pneumatic motor where multiple fluidic channels extend from the primary flow path to the individual compressible bladders. Similar to the previously described embodiments, article of footwear 1006 may also comprise an electric generator 300 operatively connected to the pneumatic motor 200 by a connection 500.

FIG. 2C depicts another embodiment of an article of footwear 1008 comprising three compressible bladders 100, 110, and 120, two of which are positioned on a portion of the article of footwear configured to be positioned beneath a heel of a foot and one of which is positioned on a portion of the article of footwear configured to be positioned beneath a ball of a foot. The article of footwear 1008 may also include a pneumatic motor 200 the compressible bladders are fluidically coupled to. Specifically, fluidic channels 400, 410, and 420 extend out from the individual bladders and are coupled to a primary fluidic channel 430 that is fluidically coupled to a port of the pneumatic motor.

As a third example, FIG. 2D depicts an article of footwear 1010 that includes a single compressible bladder 100 that is sized and shaped to be pressurized by multiple portions of a person's foot. Specifically, the article of footwear includes a compressible bladder that extends across a plurality of portions of the article of footwear that is subjected to varying pressures during a gait cycle of an individual. For example, as depicted in the figure, the compressible bladder may be sized and shaped such that it extends from a location that it is positioned beneath a heel of a foot to a ball of a foot and/or one or more toes of a person when worn. The bladder may also include a curved portion that extends around an instep region of the article of footwear which may help to minimize the amount of the compressible bladder located within regions of the article of footwear that are not subject to large cyclic pressures. Again, the compressible bladder may be fluidically connected to a pneumatic motor 200 by a fluidic channel 400. Similarly, the pneumatic motor may be operatively connected to an electric generator 300 by connection 500.

As described above, it should be understood that the arrangements, sizes, and shapes of the compressible bladders shown in FIGS. 1A-2D are not limiting, and that embodiments employing other arrangements, sizes, and shapes of compressible bladders are also contemplated. Therefore, it should also be understood that the arrangements, sizes, and presence of the other components shown in FIGS. 1A-2D is not-limiting as well. Specifically, the other components such as the fluidic channels, pneumatic motors, electrical generators, controllers, and wireless transmitters shown in these figures may be absent in some embodiments and/or may be provided using other arrangements and/or form factors. Additionally, the depicted embodiments may also be used in combination with any number of other features not depicted in the figures as the disclosure is not so limited.

Figure 3:
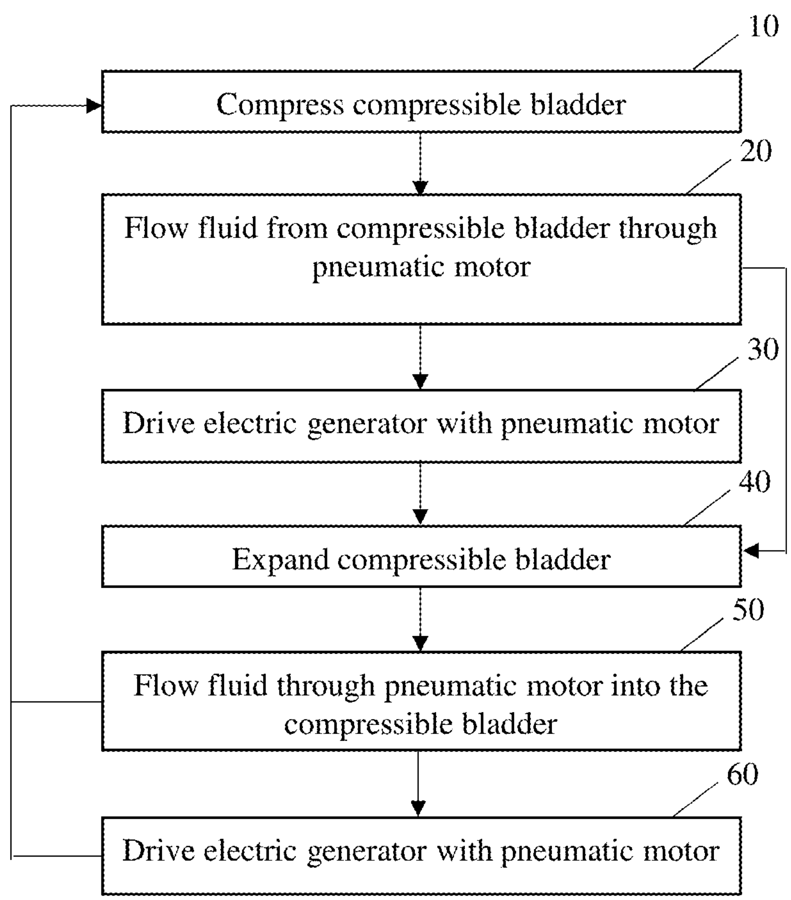
FIG. 3 is a flow chart showing steps in an exemplary method of harvesting energy, according to certain embodiments.

FIG. 3 shows one non-limiting embodiment of a flow chart showing a method of harvesting energy using the disclosed energy harvesting systems disclosed herein, which in some embodiments may be incorporated into an article of footwear. The method shown in FIG. 3 may be started or stopped at any step, and/or may be performed continuously as may occur during continuous locomotion of a user wearing the energy harvesting stem. It should be understood that methods contemplated herein may comprise any subset of the steps shown in FIG. 3, and/or may comprise further steps not shown in FIG. 3 as the disclosure is not so limited.

In certain embodiments, a method may be commenced by compressing a compressible bladder. The compressible bladder may be compressed in any suitable manner, such as by applying pressure to the compressible bladder with a foot as may occur during one or more portions of a gait cycle. Compression of the compressible bladder is shown as step 10 in FIG. 3. In step 10, a compressible bladder is compressed (e.g., a compressible bladder disposed between an outer sole and an inner surface of an article of footwear). If the compressible bladder encloses fluid prior to compression, compression of the compressible bladder may expel a portion, or substantially all, of the fluid initially enclosed by the compressible bladder from the compressible bladder. Advantageously, this fluid may be directed to a port of a pneumatic motor that may be configured to transform the flow of pressurized fluid into a different form of mechanical energy suitable for harvesting (e.g., rotational motion of a shaft), see 20. After passing through the pneumatic motor, the fluid may be expelled to, in certain embodiments, an atmosphere external to the article of footwear and/or a reservoir within the article of footwear configured to store the fluid. As shown in step 30, an output from the pneumatic motor may be used to drive an electrical generator to generate electrical energy. However, in some embodiments, electrical energy may not be generated and the output from the pneumatic motor may be coupled to a different type of component as the disclosure is not so limited. In some embodiments, a method may be concluded after harvesting energy generated by compressing a compressible bladder. In other words, a method may terminate with step 30.

In some embodiments, it may be desirable to harvest energy both during compression of a bladder and during the subsequent expansion of the bladder. In such an embodiment, after being compressed, a compressible bladder may be expanded during a method of harvesting energy from an article of footwear. The compressible bladder may be expanded in any suitable manner, such as by removing a foot applying pressure to the compressible bladder. In other words, in some embodiments, a method for harvesting energy may comprise removing a foot from a compressible bladder, which may, in some cases, cause the compressible bladder to expand. In one such embodiment, after a compressible bladder has been compressed, as may occur during steps 20 and 30 detailed above, at step 40 a compressible bladder may be expanded. Expanding the compressed bladder may reduce the pressure in the bladder, which may cause fluid to flow into the bladder from a region comprising fluid at higher pressure. The region at higher pressure may be, in certain embodiments, an atmosphere external to the article of footwear that serves as a source of air at atmospheric pressure and/or a reservoir within the article of footwear configured to store the fluid. Further, in some instances the bladder may be connected to this region of higher pressure fluid through a pneumatic motor. Accordingly, the fluid flowing into the bladder may first flow through the pneumatic motor at step 50. In other words, expanding the compressible bladder may cause fluid to flow through the pneumatic motor (e.g., in an opposite direction to the direction of flow when compressing the compressible bladder). As described above, flowing fluid through the pneumatic motor may operate the pneumatic motor to drive the associated electrical generator at step 60. Thus, electrical energy may be generated during expansion of the compressible bladder. Though embodiments in which electrical energy is not be generated during expansion of the compressible bladder (i.e., step 60 may be skipped) are also contemplated. Further, in some embodiments, a method may be concluded after harvesting energy generated by expanding a compressible bladder. In other words, a method may terminate with step 60. Though embodiments in which a compressible bladder undergoes multiple compression and expansion cycles to continuously generate energy during locomotion of an individual are also contemplated. It should also be understood that in some embodiments, one or more additional steps may be performed.

It should be understood that although FIG. 3 shows a method which begins with step 10 therein, performance of the methods described herein may sometimes begin with other steps. For instance, in some embodiments, a method may begin with step 40 in FIG. 3 where the compressible bladder expands as may occur when an individual wearing an article of footwear incorporating the currently disclosed system lifts their foot to take an initial step.

Figure 4A:
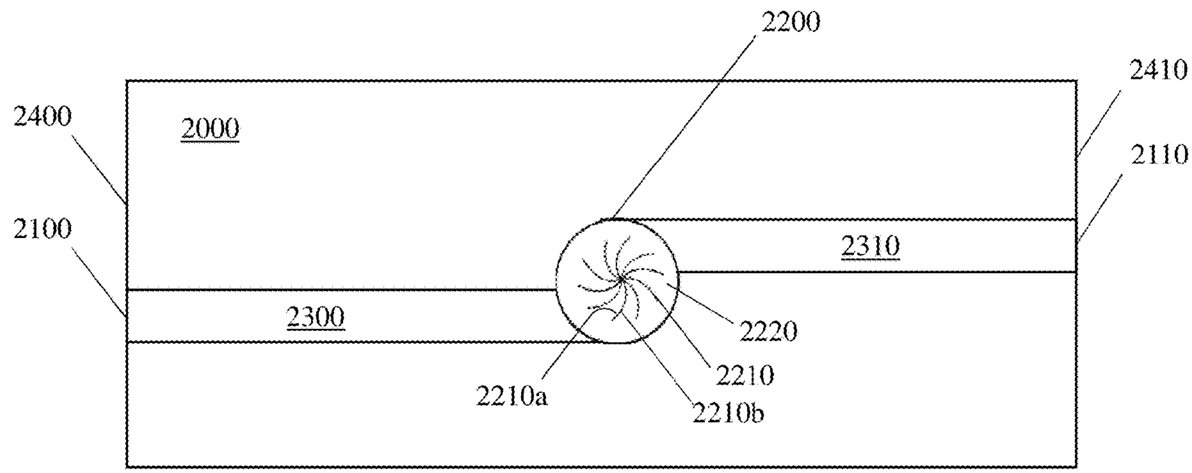
FIG. 4A is a schematic depiction of a pneumatic motor including a single turbine according to one embodiment.

As noted previously, in some embodiments, it may be desirable to drive a pneumatic motor in a single direction during operation to avoid the inefficiencies associated with repeatedly changing direction of a pneumatic motor during subsequent compression and expansion cycles of an associated bladder. FIG. 4A shows one such embodiment of a pneumatic motor 2000 that may be operated in a single direction during usage. Specifically, the pneumatic motor depicted in the figures includes a first port 2100, a second port 2110, and a turbine 2200 positioned within a correspondingly sized and shaped cavity 2220. In the depicted embodiment, the cavity is fluidically connected to first port 2100 of the pneumatic motor by a first fluidic channel 2300 and is also fluidically connected to second port 2110 of the pneumatic motor by a second fluidic channel 2310.

As would be appreciated by one of ordinary skill in the art, turbines are components that may be employed to convert energy extracted from a flow of fluid into rotational motion of an output shaft. Specifically, as shown in the figure, a turbine may be rotatably mounted within a circular cavity 2220, and may include a plurality of blades 2210. The blades may extend radially outwards from a rotational axis of the turbine as well as between upper and lower surfaces of the cavity while maintaining appropriate clearances with the surfaces of the cavity to permit rotation of the turbine. As depicted in figure, the individual blades may include a driving surface 2210*a* that a flow of fluid may be directed against to drive the turbine in a desired operational direction and an opposing surface 2210*b*. As depicted in the figures, in some embodiments, the individual blades may be curved. For example, the driving surfaces of the blades may exhibit a concave shape. However, embodiments in which the individual blades are straight, or have other shapes, are also contemplated as the disclosure is not limited in this fashion.

To facilitate unidirectional operation of a turbine 2200, the two or more channels 2300 and 2310 may be oriented towards the driving surfaces 2210*a* of the associated blades 2210 as depicted in FIG. 4A. Accordingly, fluid flowing through the channels towards the turbine may always be directed against the same driving surfaces which will drive the turbine in a single direction regardless of the direction of flow through the individual channels. Specifically, fluid may enter a pneumatic motor 2000 through a first port 2100. The fluid may then flow through the channel 2300 where it is directed into a cavity including the turbine 2200 such that the flow of fluid is directed against the driving surfaces 2210*a* of the blades 2210 of the turbine. This causes the blades to rotate such than an output shaft of the turbine, not depicted, is correspondingly rotated. As the blades rotate, the fluid exits the cavity 2220 that the turbine is located within through the second channel 2310. The fluid then exits the pneumatic motor at port the second 2110. When fluid flows in the reverse direction from the second port through the turbine to the first port, the fluid is again directed against the driving surfaces of the blades. Accordingly, the turbine may be rotated in a single direction regardless of the direction of a flow of fluid through the pneumatic motor. Although the ports and channels shown in FIG. 4A provide fluid input to a turbine in directions that are oriented approximately 180° relative to one another (i.e. parallel in opposing directions) and on diametrically opposing sides of the turbine axis of rotation, other arrangements of the ports and channels are also possible. For example, the ports and channels of the pneumatic motor may be arranged such that they are oriented perpendicular to each other, at 45° to each other, and/or in any other appropriate arrangement capable of driving the associated turbine in a desired direction as the disclosure is not so limited.

While the above embodiment is directed to a pneumatic motor including a turbine that is driven in a single direction, embodiments in which a pneumatic motor is configured to be driven in two opposite directions in response to flows in different directions are also contemplated. For example, the pneumatic motor may comprise a first port that directs fluid input to a first driving surface of the turbine blades a second port that directs fluid input to a second, opposing, driving surface of the blades within the turbine. Fluid input to the first port (e.g., from compression of a compressible bladder) will drive the turbine in the first direction, and fluid input to the second port (e.g., from an atmosphere external to an article of footwear and/or from a reservoir) will drive the turbine in the second, opposing, direction.

It should be understood that the arrangement of the ports, fluidic channels, and turbine in FIG. 4A is merely exemplary, and that if any of these features are present they may be arranged in any suitable manner. In some embodiments, like the embodiment shown in FIG. 4A, a pneumatic motor may comprise two ports and corresponding channels that provide fluid to opposing sides of a turbine. For example, in the depicted embodiment, the two ports are located on opposing first and second external surfaces 2400 and 2410 in FIG. 4A. However, embodiments in which the two or more ports of the pneumatic motor are positioned on the same external surface of the pneumatic motor and/or on different but non-opposing external surfaces of the pneumatic motor are also contemplated as the disclosure is not so limited.

Figure 4B:
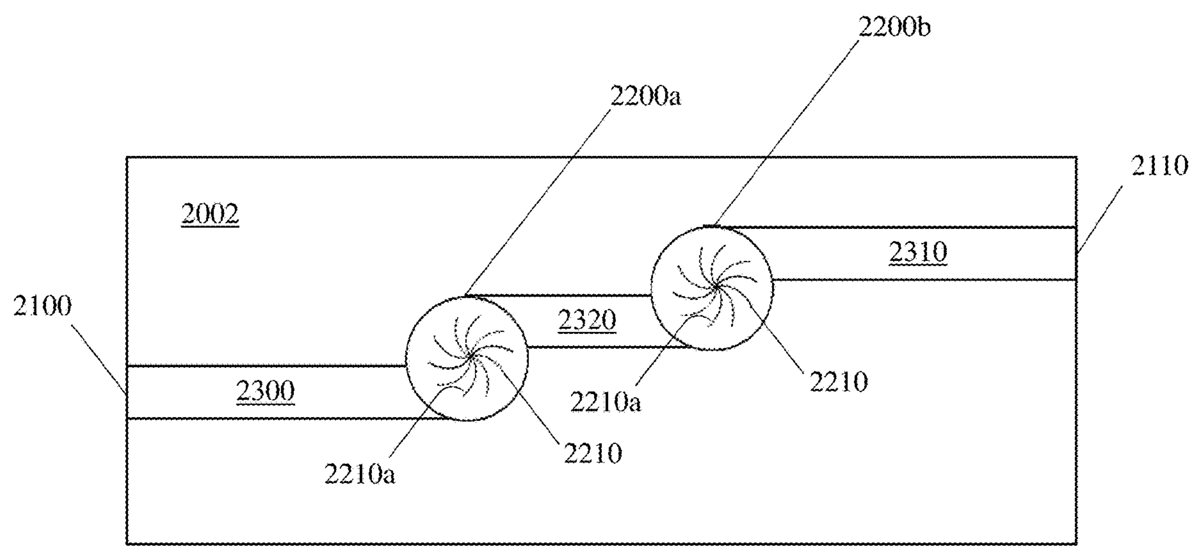
FIGS. 4B-4C is a schematic depiction of a pneumatic motor including two turbines according to one embodiment.
Figure 4C:
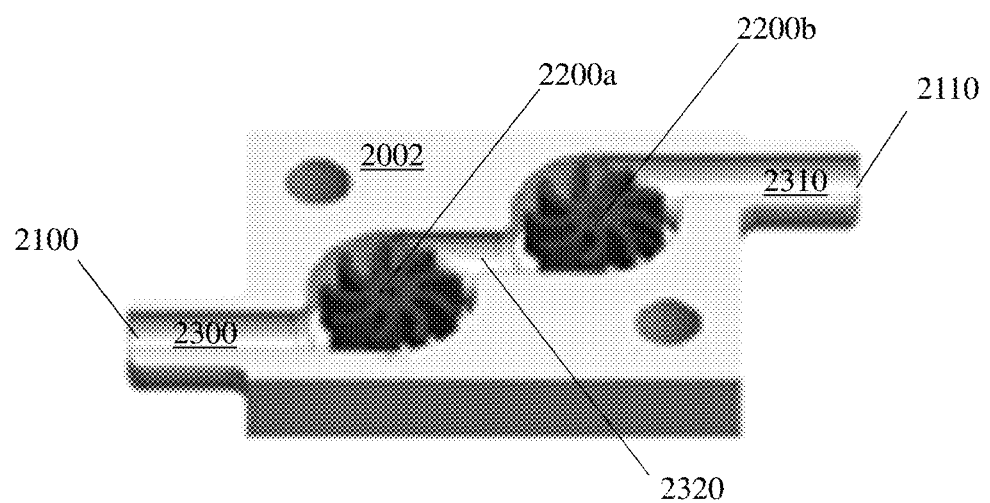
Figure 4D:
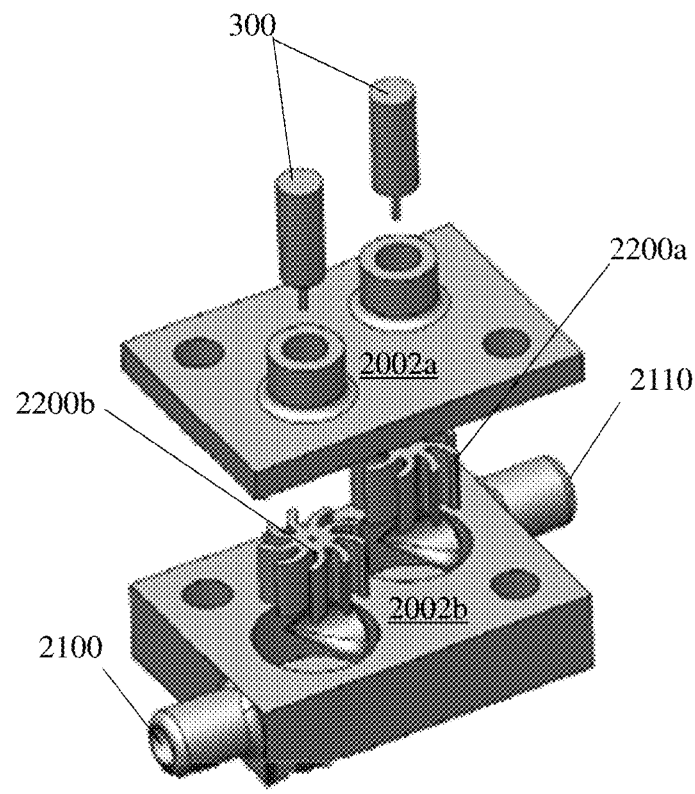
FIG. 4D is a schematic depiction of a pneumatic motor including two turbines and two associated generators according to one embodiment.

Without wishing to be bound by any particular theory, a single turbine may not harvest all of the energy contained in a fluid flowing therethrough. Therefore, in some embodiments, additional turbines may be included in a pneumatic motor to increase a proportion of energy captured from a flow of fluid through the pneumatic motor. Accordingly, a pneumatic motor may comprise a plurality of turbines including a second turbine, a third turbine, a fourth turbine, and/or any appropriate number of turbines. By way of example, FIG. 4B shows an exemplary pneumatic motor 2002 comprising a first turbine 2200*a* and a second turbine 2200*b* in addition to a first port 2100 and a second port 2110. In FIG. 4B, the first turbine 2200*a* is fluidically connected to first port 2100 by a first fluidic channel 2300 and fluidically connected to second turbine 2200*b* by a connecting fluidic channel 2320. Correspondingly, the second turbine is fluidically connected to a second port 2110 of the pneumatic motor by a second fluidic channel 2310. FIGS. 4C and 4D show further depictions of a pneumatic motor comprising two turbines with FIG. 4D also including upper and lower portions 2002*a* and 2002*b* of a pneumatic motor housing as well as two generators 300 operatively coupled to the turbines.

When a pneumatic motor comprises two or more turbines, the first port 2100 and first channel 2300 may be oriented and arranged such that they direct a fluid input towards a first driving surface 2210*a* of the blades within the first turbine 2200*a*. Correspondingly, the connecting channel 2320 may also be oriented and arranged such that it directs fluid towards the driving surfaces of the blades within both the first turbine and the second turbine depending on the direction of fluid flow. The second port 2110 and second channel 2310 may then be oriented and arranged such that they direct fluid input towards the driving surface of the blades within the second turbine as well. Accordingly, when fluid enters the first port where the first channel directs the flow of fluid against the blades of the first turbine to drive the first turbine in a first direction. The fluid flow may then pass through the connecting fluidic channel where it is directed against the driving surfaces of the blades of the second turbine to drive the second turbine in a second direction prior to exiting the pneumatic motor through the second fluidic channel and second port. Correspondingly, when fluid enters the second port, the flow of fluid may be directed against the driving surfaces of the blades of the second turbine to drive the second turbine in the second direction. The fluid may then pass through the connecting fluidic channel where it is directed against the driving surfaces of the blades of the first turbine to drive the first turbine in the first direction prior to exiting the pneumatic motor through the first fluidic channel and first port. Thus, the first and second turbines may both be operated using a single direction of rotation.

In the above described embodiment, a pneumatic motor may comprise two turbines fluidically connected by a connecting fluidic channel. The first turbine may be directly fluidically connected to a first port by a first fluidic channel and the second turbine may be directly fluidically connected to a second port by the second fluidic channel. For a pneumatic motor with this design, a fluid input (e.g., air) to the first port will flow through the first fluidic channel into the first turbine, through the first turbine and into the connecting fluidic channel, through the connecting fluidic channel and into the second turbine, through the second turbine and into the second fluidic channel, and then out the second port. A fluid input to the second port will flow through the second fluidic channel into the second turbine, through the second turbine and into the connecting fluidic channel, through the connecting fluidic channel and into the first turbine, through the first turbine and into the first fluidic channel, and then out the first port. Fluid flow through the pneumatic motor (e.g., through the first turbine and then the second turbine, or through the second turbine and then the first turbine) will typically occur across a pressure drop. A pressure drop from the first port to the second port will drive fluid through the pneumatic motor from the first port to the second port, and a pressure drop from the second port to the first port will drive fluid through the pneumatic motor from the second port to the first port.

In some embodiments, a first turbine may be driven in the same direction as a second turbine of a pneumatic motor. However, in other embodiments, the first turbine may be driven in the opposite, or a different, direction to the second turbine. Additionally, while the ports and the connecting fluidic channel shown in FIG. 4B shown provide fluid input to locations on the turbines separated by approximately 180°, other arrangements of the ports and channels are also possible.

Figure 4E:
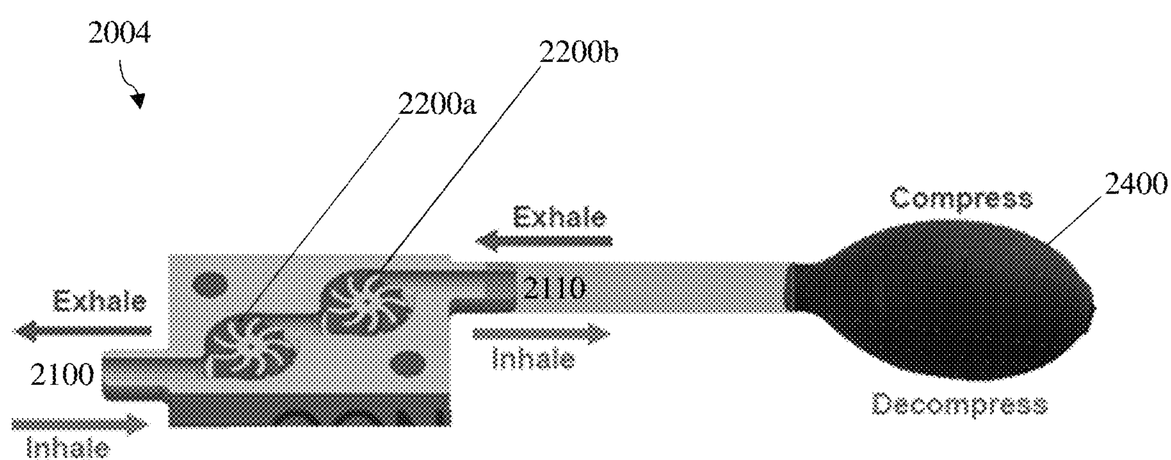
FIG. 4E is a schematic depiction of a pneumatic motor being operated with an associated compressible bladder according to one embodiment.

FIG. 4E shows an exemplary embodiment of a pneumatic motor 2004 that is connected to a compressible bladder 2400. As described above, the pneumatic motor 2004 may include one or more turbines 2200. As depicted in the figure, the compressible bladder is fluidically connected to the one or more turbines via a first port 2100. A second port 2110 of the pneumatic motor may be fluidically connected to an external atmosphere and/or a reservoir configured to receive fluid from the compressible bladder. Accordingly, expanding and compressing the compressible bladder may cause a flow of fluid to flow through the pneumatic motor in first and second opposing directions to drive the one or more turbines of the pneumatic motor. In embodiments where the one or more turbines are configured to be operated in a single direction regardless of the direction of a flow of fluid through the pneumatic motor, the turbine may be driven in a single direction during both expansion and compression of the compressible bladder. However, embodiments in which the turbines and associated ports and channels of a pneumatic motor are constructed and arranged such that the one or more turbines are driven in a first direction and a second opposing direction during expansion and compression of the compressible bladder are also contemplated.

In some embodiments, an article of footwear may comprise a generator that may output power to one or more electrical components or loads. For example, the article of footwear may output power to a boost converter and/or other appropriate power electronics. The power may then be used to power one or more electrical loads including, for example, charging a capacitor, a supercapacitor, and/or battery of the system (e.g., a secondary battery, such as a lithium ion, nickel metal hydride, nickel cadmium, or other appropriate types of batteries). In some embodiments, the component to which the power is output (e.g., a capacitor, a super capacitor, and/or a battery) may be configured to serve as a buffer for the generated energy. For example, energy generated in pulses and/or continuously at a first rate may be supplied from a generator to charge the buffer over a period of time. Energy stored in the buffer may then be output to power one or more associated electrical loads. This may be especially beneficial in instances where the power generated by a system is insufficient to continuously power a particular electrical load, but may be used to intermittently power that load. In some embodiments, an article of footwear, or other wearable system incorporating an energy harvesting system, may further comprise one or more connections configured to electrically couple an external electronic device to a generator. Such a connector may include, but is not limited to a USB port, a lightning port, a power jack, an Ethernet port, and the like.

In some embodiments, an article of footwear may comprise a generator that is configured to provide power to operate and/or charge an associated electronic device. Non-limiting examples of suitable electronic devices include transmitters, receivers, GPS receivers, sensors (e.g., motion sensors, position sensors, strain gauges, inertial monitoring units), and the like. For example, in some embodiments, an article of footwear may be configured to acquire data from a wearer. The data may be any suitable type of data, such as acceleration data, fitness data, location data, and the like. Again, the data may be acquired by any suitable sensor, such as a motion sensor, a position sensor, a strain gauge, an inertial monitoring unit (IMU), and the like.

In some embodiments, an article of footwear may include one or more features configured to communicate with a computing device located external to the article of footwear or other wearable device (e.g., communicate data acquired from a wearer and/or communicate in response to data acquired from a wearer). For example, the article of footwear may comprise a GPS receiver. The GPS receiver may be configured to communicate with the external computing device which may be include devices such as smart phones, tables, remotely located computers or databases, or any other appropriate device in any suitable manner including using a cellular network, Bluetooth communication, radio frequency signals, wifi, and/or using any other appropriate communication protocol. In such an embodiment, the electric generator may be configured to charge the GPS receiver. In some embodiments, the GPS receiver may transmit data continuously (e.g., if the article of footwear supplies sufficient energy to allow for continuous data transmission). However, in embodiments where power generated by a particular energy harvesting system does not provide sufficient power for continuous operation, the GPS receiver may transmit data intermittently. If the GPS receiver transmits data intermittently, it may transmit data when the energy stored within the article of footwear exceeds a certain threshold, such as a minimum threshold required to transmit the signal and/or when a supplied operating power of the energy harvesting system exceeds a minimum threshold operating power of the GPS receiver. For example, as described above, a system may comprise a buffer such as a super capacitor that may store harvested energy that may then be subsequently supplied to the GPS device either continuously and/or intermittently depending on the amount of energy being generated by the system.

Figure 5:
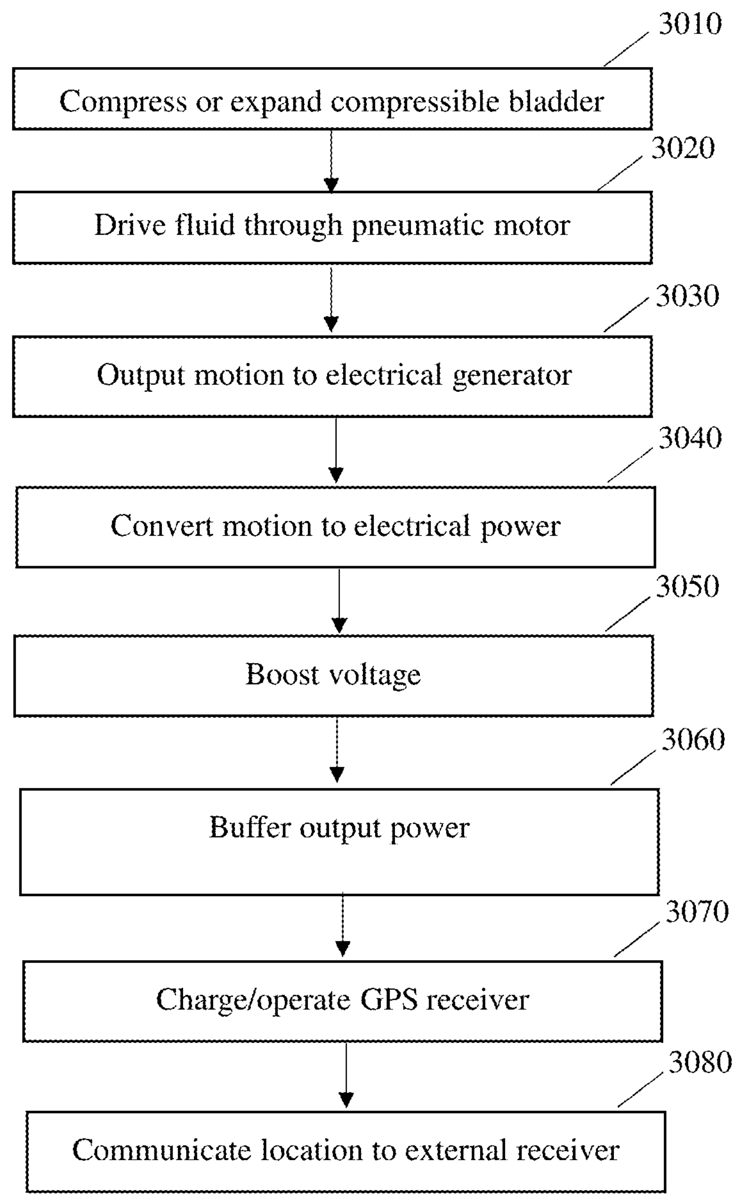
FIG. 5 is a flow chart showing steps in an exemplary method of harvesting energy and communicating location information, according to certain embodiments.

FIG. 5 shows one example of a method that may be employed to harvest energy and use the harvested energy to power a GPS device. FIG. 5 begins with step 3010, in which a compressible bladder is compressed or expanded. The compression or expansion of the compressible bladder drives fluid through a pneumatic motor, at 3020. The pneumatic motor outputs motion to an associated electrical generator in step 3030. The output motion is then converted to electrical power by the electric generator in step 3040. In step 3050, the voltage may be boosted by a boost converter and/or otherwise transformed using any appropriate electrical component. In step 3060, the energy may be stored in a buffer such as a capacitor, super capacitor, and/or battery. The buffer may then provide the stored power to one or more electrical loads such as a GPS receiver at step 3070. In step 3080, the GPS receiver may communicate location information to an external receiver.

While the above embodiment is directed to providing power to a GPS receiver, embodiments in which the power is output to other types of electrical loads are also contemplated. For example, other appropriate electrical loads that may receive power from an energy harvesting system include, but are not limited to, mobile devices connected to an associated electrical port for recharging of the mobile device, sensors (such as fitness monitoring sensors), footwear illumination, and/or footwear climate control systems. Of course embodiments in which the energy harvesting systems are used to power other types of electrical loads are also contemplated as the disclosure is not so limited.

In some embodiments, an article of footwear may be configured to have one or more features that change dynamically in response to data acquired from a wearer and/or during use. The features may be controlled by a controller, such as one or more processors, located inside of an article of footwear, or other wearable system. For example, the article of footwear may comprise a controller that is configured to receive input sensed by one or more sensors in the article of footwear and to send instructions to dynamically adjust one or more operating parameters of the article of footwear based on this input. For example, in some embodiments, it may be desirable to change the stiffness, i.e. feel, of an article of footwear depending on the type of locomotion a person is participating in (i.e. walking versus running).

Figure 6:
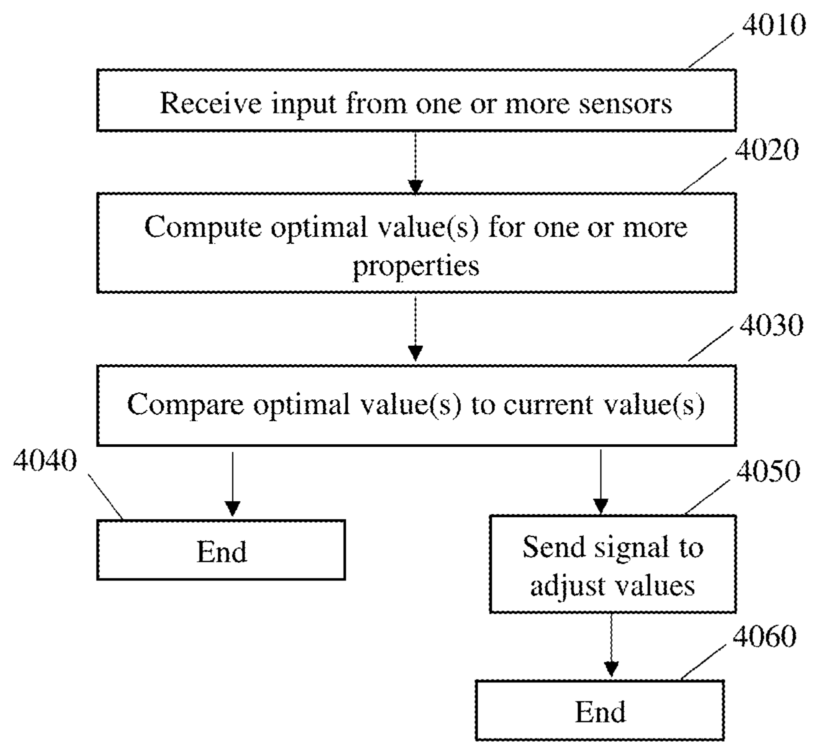
FIG. 6 is a flow chart showing steps in an exemplary method of varying the values of one or more properties of an article of footwear, according to certain embodiments.

FIG. 6 shows one exemplary method for sensing information and adjusting one or more operating parameters for an article of footwear based on the sensed information. FIG. 6 begins with step 4010, in which information acquired by a sensor, such as an IMU or accelerometer, may be transmitted from the sensor to the controller. Then, at step 4020, the controller may use an algorithm to determine optimal value(s) for a property or set of properties for the article of footwear based on the information acquired by the sensor, is performed. For example, the controller may identify a frequency of applied accelerations to the footwear to determine whether or not the individual wearing the footwear is walking, running, or participating in another form of locomotion. This is followed by step 4030, in which the optimal value(s) of the property or set of properties is compared to the current value(s) of the property or properties of the article of footwear. If the current property or properties are within acceptable predetermined limits, the method is ended, as in step 4040. If the current property or properties are not within acceptable predetermined limits, the controller sends a signal to adjust the value(s) of the property or properties to their optimal value, as in step 4050. Then, the method is ended, as in step 4060. For example, as described further below, in one specific embodiment, a controller may adjust the stiffness of an article of footwear by adjusting the resistance to flow applied to a flow of fluid through a pneumatic motor based on the determined form of locomotion of the individual.

In view of the above, an article of footwear may have a variable stiffness such that an average stiffness and/or a time-dependent stiffness of the footwear may be varied. The stiffness of the article of footwear may be varied by a controller varying the load applied to one or more electric generators operatively coupled to one or more pneumatic motors of a system. A higher load may increase the hydraulic resistance of an associated pneumatic motor which will restrict fluid flowing to and from the associated compressible bladder(s) which will stiffen the article of footwear. A lower load may correspondingly reduce the resistance of the pneumatic motor and reduce the stiffness of the article of footwear. For example, the electric generator may comprise a variable resistor that can modulate the resistance, and/or pulse width modulation may be applied to a load may to control a resistance applied to a generator. Again, a controller may vary the stiffness of the article of footwear based on one or more characteristics of the locomotion of a wearer of the article of footwear. For example, the article of footwear may be configured to reduce its stiffness during faster and/or higher intensity locomotion such as running, and/or may be configured to enhance its stiffness during slower and/or lower intensity locomotion. Additionally, a controller may identify faster and/or higher intensity locomotion using: threshold accelerations to determine forces being applied; threshold acceleration frequencies to distinguish between walking, jogging, running, jumping, etc.; and/or any other appropriate type information capable of distinguishing different types of motion of an individual.

The components of the article of footwear may be fabricated in any suitable manner. Non-limiting examples of suitable manufacturing methods include 3D-printing, injection molding, vacuum molding, machining, and the like.

Example: Prototype Energy Harvesting Article of Footwear

This Example describes a prototype of an energy harvesting article of footwear. The energy-harvesting article of footwear included a pneumatic motor including two microturbines located in series. Each microturbine was operatively coupled to a separate generator. The pneumatic motor was fluidically connected to several air bladders positioned in the shoe (two at the heel and one at the ball of the foot). The article of footwear was worn by an individual engaging in different forms of locomotion. The voltage and power outputs from the article of footwear for the different types of location was measured as a function of time during the experiments.

Figure 7:
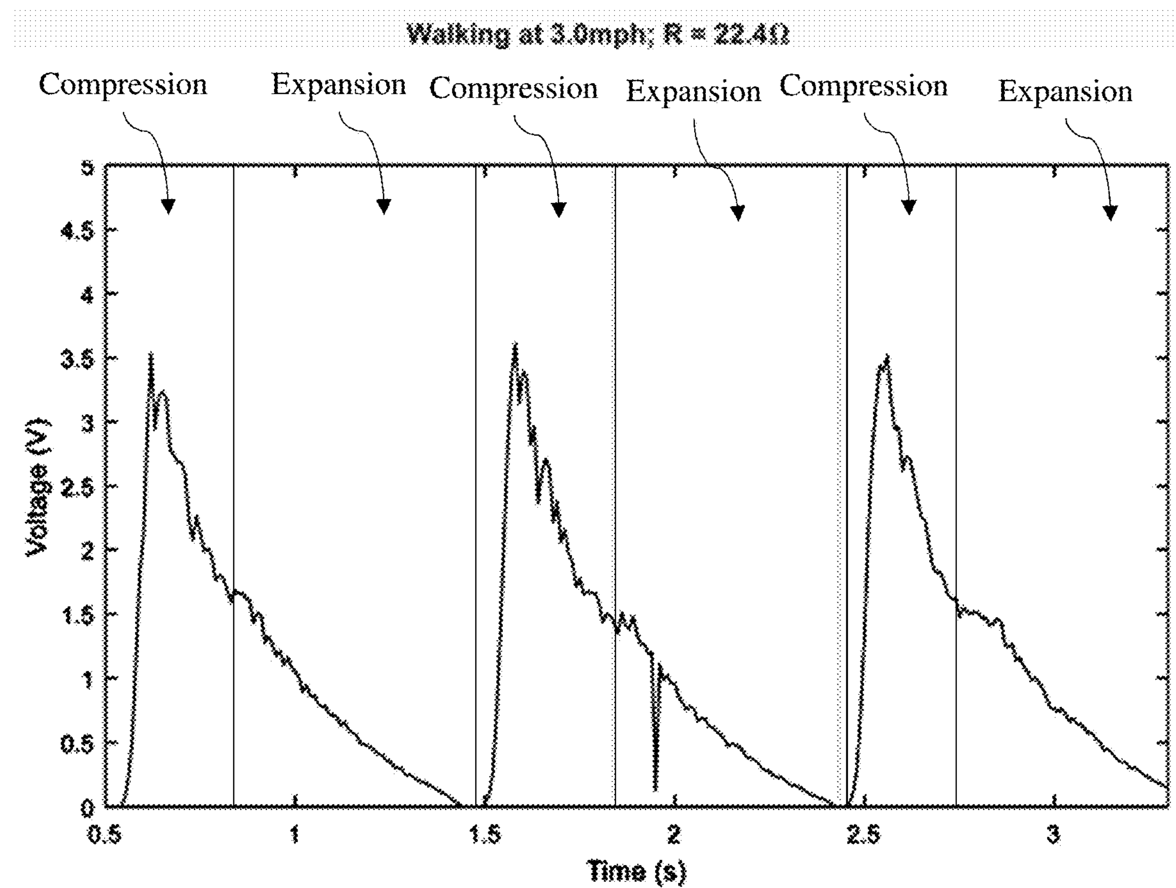
FIG. 7 is a chart showing voltage generation as a function of time, according to certain embodiments.

FIG. 7 shows the voltage generated as a function of time for the article of footwear while walking at 3 MPH. As shown in the figure, peak voltages occurred when compression of the air bladders was initiated. The peaks had a maximum voltage of approximately 3.5 V, and were separated in time by approximately 1 second. The average generated energy was approximately 90 mW per foot. During the down-step, the bladders exhale creating the peak power observed, which can be up to 900 mW during jumping. When the foot lifts off, the bladders decompress creating a smaller local peak in voltage as the turbines rotate nearly continuously. The voltage then continued to decrease until the next heel strike initiated the next voltage pulse.

Figure 8A:
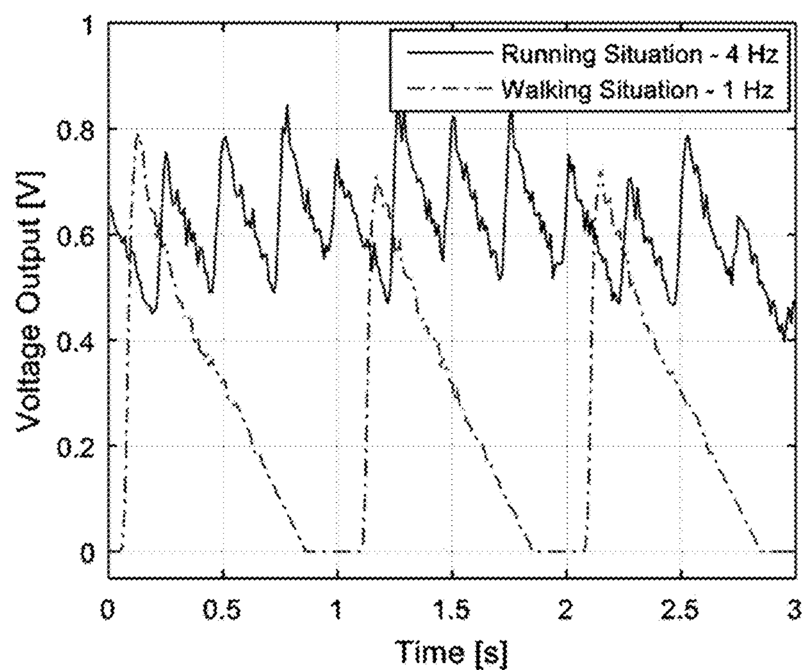
FIG. 8A is a chart depicting the open circuit voltage of an electric generator, according to certain embodiments.
Figure 8B:
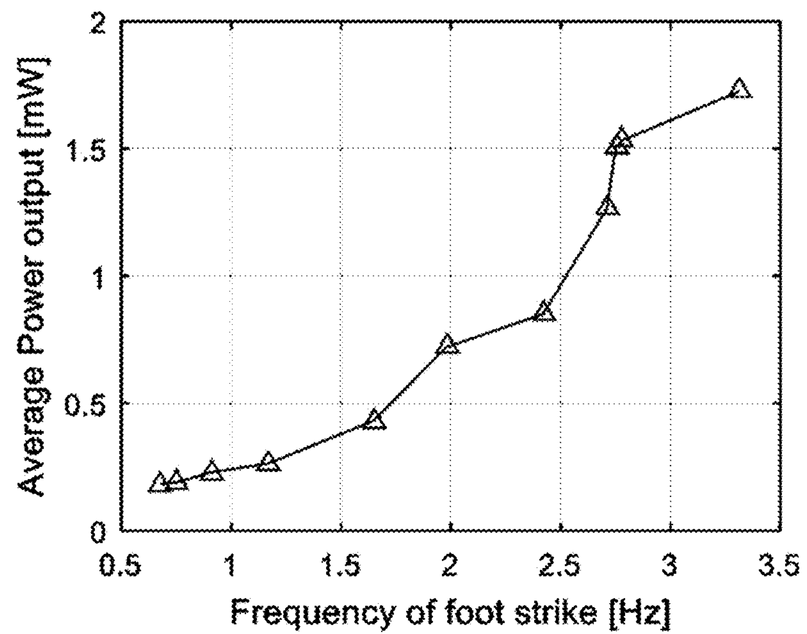
FIG. 8B is a chart depicting the average power output with different footstep frequencies, according to certain embodiments.
Figure 8C:
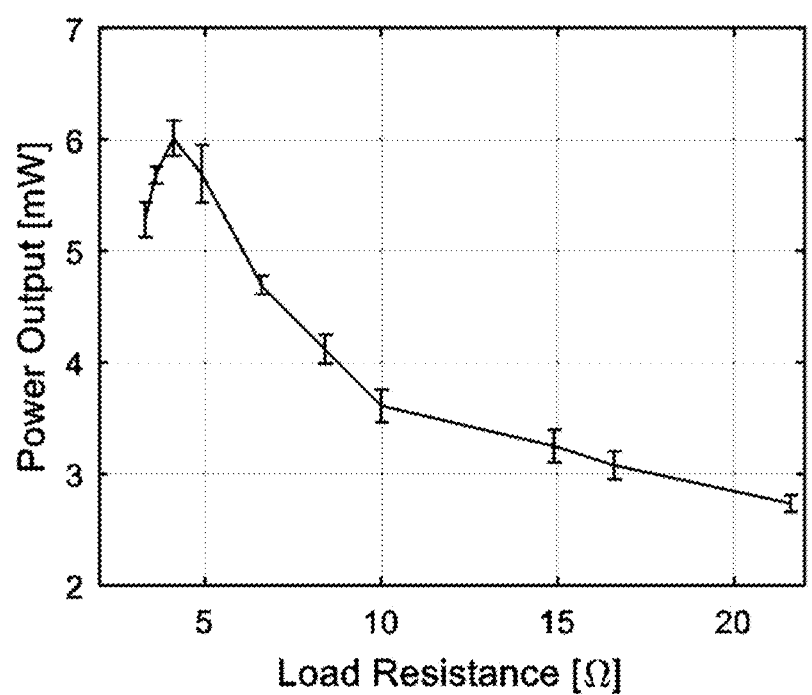
FIG. 8C is a chart depicting the measured peak power output for a single footstep, according to certain embodiments.

During walking (approximately 1 Hz), the turbines rotated intermittently. In contrast the turbines rotated continuously during running (approximately 4 Hz). The average power output was on the mW scale, with a maximum of 86 mW provided to a 4.9 ohm load. FIG. 8A shows a chart depicting the open circuit voltage of the generator for different motions. FIG. 8B shows a chart depicting the average power output with different footstep frequencies. FIG. 8C shows a chart depicting the measured peak power output for a single footstep as a function of load resistance.

The prototype article of footwear was modified to include a GPS receiver such that energy was output from the generators of the system to charge the GPS receiver. The GPS receiver was operated intermittently to transmit GPS coordinates to an external receiving station whenever a threshold state of charge of the GPS receiver, or an associated electrical storage device, was met. During running, the GPS receiver was capable of being continuously operated to transmit the GPS coordinates.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An energy-harvesting article of footwear, comprising:

an outer sole;

an inner surface;

a pneumatic motor comprising a first port and a second port;

a first compressible volume disposed between the outer sole and the inner surface in a first portion of the article of footwear, the first compressible volume fluidically connected to the first port of the pneumatic motor, wherein fluid flows into and out of the first compressible volume through the first port during compression and expansion of the first compressible volume;

a second compressible volume disposed between the outer sole and the inner surface in a second portion of the article of footwear, the second compressible volume fluidically connected to the second port of the pneumatic motor;

a third compressible volume disposed between the outer sole and the inner surface in a third portion of the article of footwear, the third compressible volume fluidically connected to the second port of the pneumatic motor; and an electric generator operatively coupled to the pneumatic motor, wherein the electric generator converts motion of the pneumatic motor into electrical power.

2. The energy-harvesting article of footwear of claim 1, wherein at least one of the first, second, and third compressible volumes is configured to expand from a fully compressed state to a fully expanded state over a time period of greater than or equal to 0.2 seconds and less than or equal to 1 second.

3. The energy-harvesting article of footwear of claim 1, wherein the first, second, and third compressible volumes are configured to be compressed sequentially during locomotion.

4. The energy-harvesting article of footwear of claim 1, wherein at least one of the first, second, and third compressible volumes drives the pneumatic motor during both compression and expansion.

5. The energy-harvesting article of footwear of claim 1, wherein at least one of the first, second, and third compressible volumes is located within a portion of the article of footwear located adjacent to one or more of a heel of a foot, a ball of the foot, and toes.

6. The energy-harvesting article of footwear of claim 1, wherein the electric generator is configured to charge at least one of a capacitor, a super capacitor, and a battery.

7. The energy-harvesting article of footwear of claim 1, further comprising a GPS receiver that is electrically coupled to the electrical generator, wherein the GPS receiver is configured to communicate with an external computing device.

8. The energy-harvesting article of footwear of claim 1, further comprising one or more connections configured to electrically couple an external electronic device to the electric generator.

9. The energy-harvesting article of footwear of claim 1, further comprising a controller that varies a load applied to the electric generator to vary a stiffness of the article of footwear.

10. The energy-harvesting article of footwear of claim 1, wherein the pneumatic motor further comprises:

a first turbine fluidically connected to the first port and the second port, wherein fluid input to the first port drives the first turbine in a first direction and flows through the second port, and wherein fluid input to the second port drives the first turbine in the first direction and flows through the first port.

11. The energy-harvesting article of footwear of claim 10, wherein the pneumatic motor further comprises:

a second turbine fluidically connected to the second port; and a connecting channel fluidically connected to the first turbine and the second turbine, wherein fluid input to the first port drives the first turbine in the first direction, flows through the connecting channel, drives the second turbine in a second direction, and flows through the second port, and wherein fluid input to the second port drives the second turbine in the second direction, flows through the connecting channel, drives the first turbine in the first direction, and flows through the first port.

12. The energy-harvesting article of footwear of claim 10, wherein the first turbine includes a plurality of blades, each blade including a driving surface, wherein the pneumatic motor further comprises a first channel disposed between the first port and the first turbine and a second channel disposed between the second port and the first turbine, and wherein the first channel and the second channel are oriented towards the driving surfaces of the plurality of blades.

13. The energy-harvesting article of footwear of claim 12, wherein the first and second channels are parallel and located on diametrically opposing sides of an axis of rotation of the first turbine.

14. The energy-harvesting article of footwear of claim 1, further comprising:

a first flow path configured to fluidically connect the first compressible volume to the first port; and a second flow path configured to fluidically connect the second compressible volume to the second port.

15. The energy-harvesting article of footwear of claim 14, further comprising a third flow path configured to fluidically connect the third compressible volume to the second flow path at a location between the second compressible volume and the second port.

16. A method of harvesting energy, comprising:

compressing a first compressible volume disposed between an outer sole and an inner surface of an article of footwear to flow fluid from the first compressible volume to a first port of a pneumatic motor to generate electrical power using an electric generator coupled to the pneumatic motor;

compressing a second compressible volume disposed between the outer sole and the inner surface of the article of footwear to flow fluid from the second compressible volume to a second port of the pneumatic motor to generate electrical power using the electric generator; and compressing a third compressible volume disposed between the outer sole and the inner surface of the article of footwear to flow fluid from the third compressible volume to the second port of the pneumatic motor to generate electrical power using the electric generator.

17. The method of claim 16, further comprising expanding at least one of the first, second, and third compressible volumes from a fully compressed state to a fully expanded state over a time period of greater than or equal to 0.2 seconds and less than or equal to 1 second.

18. The method of claim 16, further comprising compressing the first, second, and third compressible volumes disposed between the outer sole and the inner surface sequentially during locomotion.

19. The method of claim 16, wherein at least one of the first, second, and third compressible volumes is compressed by one or more of a heel of a foot, a ball of the foot, and toes.

20. The method of claim 16, further comprising charging at least one of a capacitor, a super capacitor, and a battery with the electric generator.

21. The method of claim 16, further comprising powering a GPS receiver with the electric generator, wherein the GPS receiver communicates with an external computing device.

22. The method of claim 16, further comprising coupling an external electronic device to the electric generator.

23. The method of claim 16, further comprising varying a load applied to the electric generator to vary a stiffness of the article of footwear.

24. The method of claim 16, further comprising:

flowing the fluid from the first compressible volume to the first port of the pneumatic motor and through a first turbine, wherein the fluid input to the first port drives the first turbine in a first direction; and flowing fluid input to the second port of the pneumatic motor and through the first turbine, wherein the fluid input to the second port drives the first turbine in the first direction.

25. The method of claim 24, further comprising flowing the fluid input into the first port through the first turbine to a second turbine located in series with the first turbine, and flowing the fluid input into the second port through the second turbine to the first turbine.

26. The method of claim 25, wherein fluid input to the first port drives the second turbine in a second direction, and wherein fluid input to the second port drives the second turbine in the second direction.

27. The method of claim 24, wherein the first turbine includes a plurality of blades, each blade including a driving surface, and the method further comprising: directing the fluid input to the first port towards the driving surfaces of the plurality of blades and directing the fluid input to the second port towards the driving surfaces of the plurality of blades.

28. The method of claim 16, wherein compressing one or more of the first, second, and third compressible volumes generates an average power over time that is greater than or equal to 50 mW.

* * * * *